Aug. 29, 1933.    E. J. W. RAGSDALE    1,924,881
OPEN TRUSS GIRDER
Filed Feb. 13, 1930
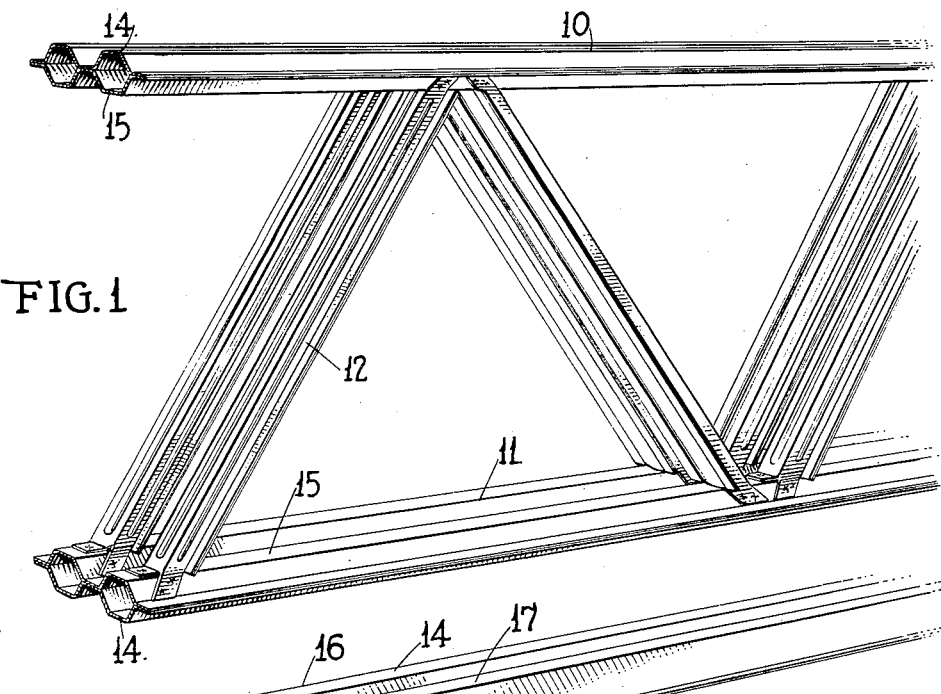
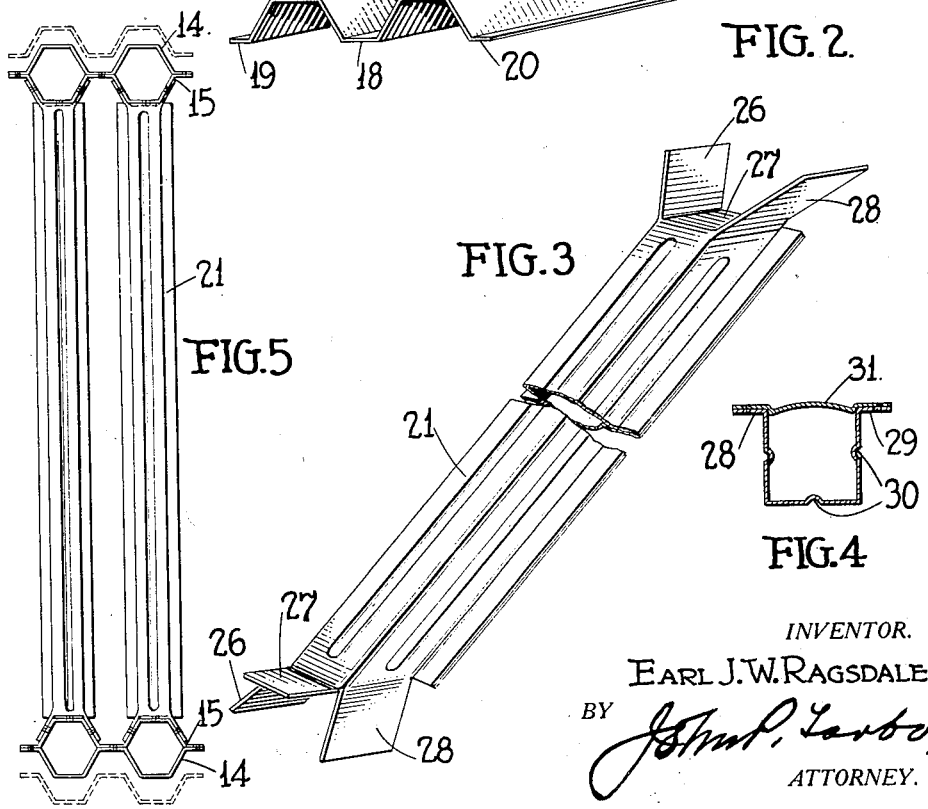
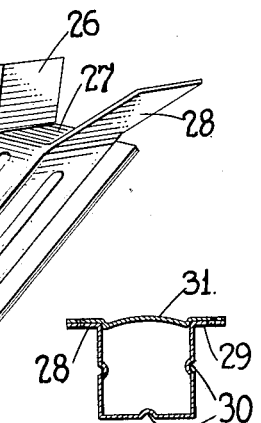
INVENTOR.
EARL J. W. RAGSDALE
BY
ATTORNEY.

Patented Aug. 29, 1933

1,924,881

UNITED STATES PATENT OFFICE 1,924,881

OPEN TRUSS GIRDER

Earl J. W. Ragsdale, Norristown, Pa., assignor to Edward G. Budd Manufacturing Company, Philadelphia, Pa., a corporation of Pennsylvania Application February 13, 1930. Serial No. 428,027

5 Claims. (Cl. 189—37)

The invention relates to open trussed girders and particularly to such girders made out of sheet metal, and especially adapted for aircraft construction.

It is an object of my invention to provide a truss of this kind in which the ratio of the strength to the weight is relatively large in which the parts are so constructed and arranged as to permit of ease of assembly by spot welding that easiest and most rapid method of joining sheet metal. In other words, it is a main object of my invention to remove weight, adaptability and cost limitations in this form of truss.

I propose to use a flat strip stock of alloy steel of high physical characteristics, of rustless steel, which can be rolled to any desired shape either at the mills or at the fabricating plants and die formed to some extent. Utilization of strip stock guarantees its availability in reasonable widths in unlimited lengths, providing continuity of all members from one end of the truss to the other. Spot welding constitutes one of the most rapid securing means known, and also one of the most perfect from the standpoint of strength, yet it is a weightless fastening means requiring no metal other than that of the stock joined. The amount of spot welding may be multiplied unlimitedly without adding weight. Nor does it cut into the body of the members joined or impair their strength, no matter what the multiplication of its use. This factor, coupled with the high physical characteristics of the rustless steel alloy when utilized according to the structure and method of the invention achieve for me its principal object—the removal to some extent of the limitations of adaptability and cost—and the structure and method go the balance of the way in removal of these limitations.

According to my invention, I form the chords of the girders of two integral members secured together substantially in the transverse plane of symmetry of the chords, and I connect the webbing joining the chords, such as the Warren type of trussing shown, to the inner of the members of the chords prior to the assembly of the outer members therewith.

For convenience of assembly and for greater strength the members forming the chords are made of angular section, each comprising, in the present instance, two hollow portions, each forming half of a hexagon, an interconnecting portion joining the hollow portions and edge flanges in the same plane as the connection portion, which is the plane of joinder.

The web members are of hollow form comprising in main a channel section, the ends of the three walls of the channel being formed to seat flat against the three sides of the hollow hexagonal portion of the inner member of a chord to facilitate securing and to make a strong joint. The webs may be made a completely closed section by the application of a closing member over the open mouth of the channel.

In the embodiment shown I have arranged the webbing according to the Warren type of trussing, but it will be understood that the arrangement will vary with the particular use to which my novel improved construction is intended. Such a construction as that disclosed herein is particularly applicable to aircraft construction, such as the wing spars of airplanes.

In the drawing,

Fig. 1 represents in perspective, a portion of a girder according to my invention.

Fig. 2 represents in perspective and on an enlarged scale, a portion of an element forming one half of a chord.

Fig. 3 represents in a perspective view and on an enlarged scale, a hollow web member according to the invention.

Fig. 4 is a cross sectional view of the web member of Fig. 3.

Fig. 5 is an end view of a girder according to the invention, the outer chord members being shown in dotted lines in position for assembly and in full lines in the assembled position.

Referring to the drawing, where I have illustrated a truss of the Warren type having upper and lower chords 10 and intervening zig-zag webbing 12, each of the chords is built up of two members 14 and 15 joined in the transverse plane of symmetry of the chord. This construction enables me to use but one section of rolled or otherwise formed stock to build up the chords of my invention.

Each member, as 14, of a chord comprises a pair of convex portions 16 and 17 of half hexagonal section joined by an intermediate portion 18 and edge flanges 19 and 20, the portions 16 and 17 providing spaced hollow closed sections. The half members 14 and 15 of a chord may be readily brought together as indicated in Fig. 5, and joined in the final assembly by spot welding together the opposing portions 18, 19 and 20 on the respective members.

According to my invention, the webbing 12 is first assembled to the inner of the chord members, as 15, and this webbing, in the present case, consists of hollow generally channel section members 21 diagonally extending between the chords and having the bottom and side walls extended and bent to form tabs 26, 27 and 28 adapted to seat, respectively, against the three faces of the half hexagonal sections of the inner chord members, and to be strongly secured thereto by spot welding. To avoid bending the bottom wall through a large angle and thus weakening the joint, the tabs 27 at the opposite ends of the web members are turned in opposite directions.

The channel section web member 21 may be reinforced by edge flanges 28, 29 and by ribs 30 in its bottom and side walls, and further, by making it a closed section by the application to the open mouth thereof of the grooved plate member 31 welded to the edge flanges 28, 29. The members 31 may be applied to the channels 21 either before or after the channel members are secured to the chord members.

After the inner half chord members have been secured to the web members the outer half chord members are brought into position, as indicated in the dotted lines of Fig. 5, for assembly with the inner half members, which is readily effected, as shown, in the full lines of Fig. 5 by spot welding together the opposed overlapping portions 18, 19 and 20 to form the double hollow chord member of the completed girder.

It will be seen that a separate system of webbing is employed between each of the opposed hollow section portions of the two chords.

It will be understood that changes and modifications may be made from the precise construction described without departing from the spirit of the invention and the scope of the claims appended hereto.

What I claim is:

1. An open trussed girder comprising hollow chords, the hollow portions of which are of general channel form having two side walls and a bottom wall, and three-sided hollow web members secured to the inner sides of said hollow portion through integral extensions of the walls of their hollow section, the extensions of the three walls being bent to fit against the corresponding three walls of said hollow chords.

2. An open trussed girder comprising hollow chords, the hollow portions of which are of substantially hexagonal cross section and built up of members joined substantially in the transverse plane of symmetry of said chords, and hollow web members having at least three side walls, the ends of said walls being integrally formed to fit against, respectively, the three inner side walls of said hollow chord portions and secured thereto.

3. An open trussed girder comprising hollow chords built up of members dividing it in the transverse plane of symmetry and forming a plural polygonal section, and sets of webbing joining the three inner walls of each of said hollow sectional portions of one of the chords with the corresponding portions of the other chord to form the complete girder.

4. An open trussed girder comprising hollow chords having a plurality of hollow sections and directly joined together between said hollow sections and outside thereof, and hollow web members joining said chords and having their ends integrally extended and shaped to embrace the hollow sections of the chord members and secured thereto.

5. An open truss girder comprising hollow chords, the hollow portions of which are of general channel form having two side walls and a bottom wall, and three sided hollow web members spot welded to the inner sides of said hollow portion through integral extensions of at least the side walls of their hollow section fitting against the corresponding side walls of said hollow chords.

EARL J. W. RAGSDALE.